(12) United States Patent
Hsu

(10) Patent No.: US 6,540,430 B2
(45) Date of Patent: Apr. 1, 2003

(54) QUICK RELEASE CLASPING DEVICE FOR RAKE OR OTHER TOOLS

(76) Inventor: Shih Hao Hsu, No. 426, Dou Yuan East Road, Bi Tou Hsiang, Chang Hua Hsien (TW)

(*) Notice: Subject to any disclaimer, the term of this patent is extended or adjusted under 35 U.S.C. 154(b) by 13 days.

(21) Appl. No.: 09/837,984

(22) Filed: Apr. 20, 2001

(65) Prior Publication Data

US 2002/0154943 A1 Oct. 24, 2002

(51) Int. Cl.[7] .................................................. F16B 7/10
(52) U.S. Cl. ................ 403/322.4; 403/373; 403/374.5; 403/374.1; 403/109.5; 248/113; 248/541
(58) Field of Search ............................. 403/373, 374.1, 403/374.2, 374.3, 374.5, 109.5, 322.1, 322.4; 248/113, 541; 285/312, 302; 292/339, 289

(56) References Cited

U.S. PATENT DOCUMENTS 4,596,484 A * 6/1986 Nakatani ............. 403/109.5 X
5,154,449 A * 10/1992 Suei-Long ........... 403/109.5 X
5,664,904 A * 9/1997 Hapgood et al. .... 403/322.4 X
5,852,923 A   12/1998 Wei

* cited by examiner

Primary Examiner—Lynne H. Browne
Assistant Examiner—Ryan Flandro
(74) Attorney, Agent, or Firm—Charles E. Baxley

(57) ABSTRACT

A quick release clasping device for a rake includes a handle slidably engaged through a barrel. The barrel has an opening formed between two flaps for slidably receiving a press piece which has two ears. A lever has a cam engaged between and rotatably secured to the ears and the flaps with a shaft which may retain the press piece to the flaps. The ears each have an oblong hole for slidably receiving the shaft and for allowing the press piece to be slid relative to the shaft and the flaps for a limited sliding movement.

5 Claims, 3 Drawing Sheets

QUICK RELEASE CLASPING DEVICE FOR RAKE OR OTHER TOOLS

BACKGROUND OF THE INVENTION

1. Field of the Invention

The present invention relates to a quick release clasping device, and more particularly to a quick release clasping device for rake or other tools.

2. Description of the Prior Art

Typical rakes or other tools comprise a handle slidably engaged in a barrel, and a quick release clasping device may be used for detachably securing the handle to the barrel. U.S. Pat. No. 5,852,923 to Wei discloses one of the typical quick release clasping devices for the typical rakes which includes a cam lever engaged with a press piece for forcing the press piece to engage with and to clamp the handle to the barrel. However, the press piece is movably received in the barrel and the barrel has no retaining devices for retaining the press piece within the barrel such that the press piece may be disengaged from the barrel when the handle is removed or disengaged from the barrel.

The present invention has arisen to mitigate and/or obviate the afore-described disadvantages of the conventional quick release clasping devices for tools.

SUMMARY OF THE INVENTION

The primary objective of the present invention is to provide a quick release clasping device for a rake or other tools including a press piece that may be stably retained in the clasping device and will not be disengaged from the clasping device when the handle is removed or disengaged from the clasping device.

In accordance with one aspect of the invention, there is provided a quick release clasping device for a tool, the quick release clasping device comprising a barrel including a bore formed therein, and including a pair of flaps extended therefrom, and including an opening formed therein and communicating with the bore of the barrel, a handle slidably engaged through the bore of the barrel, a press piece slidably received in the opening of the barrel for engaging with the handle, the press piece including a pair of ears extended therefrom, a lever including a first end having a cam provided thereon and engaged between the ears and the flaps and including a second end, and a shaft engaged through the flaps and the ears and the cam for rotatably securing the cam to the flaps and for retaining the press piece to the flaps of the barrel and for preventing the press piece from being disengaged from the flaps of the barrel.

The ears of the press piece each include an oblong hole formed therein for slidably receiving the shaft relatively, and for allowing the press piece to be slid relative to the shaft and the flaps for a limited sliding movement.

The flaps of the barrel each include a channel formed therein for slidably receiving the ears of the press piece. The flaps of the barrel each include a bulge extended outward therefrom for reinforcing the flaps and for allowing the channels to be formed in the flaps respectively.

The flaps each include an extension extended therefrom. A device is further provided for retaining the second end of the lever to the barrel and includes at least one projection provided on the extension of the flap, and includes at least one cavity formed in the second end of the lever for receiving the projection and for locking the second end of the lever to the extensions of the flaps and to the barrel. The second end of the lever may be disengaged from or rotated away from the barrel by engaging the finger into a space that is formed between the extension of the flaps.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
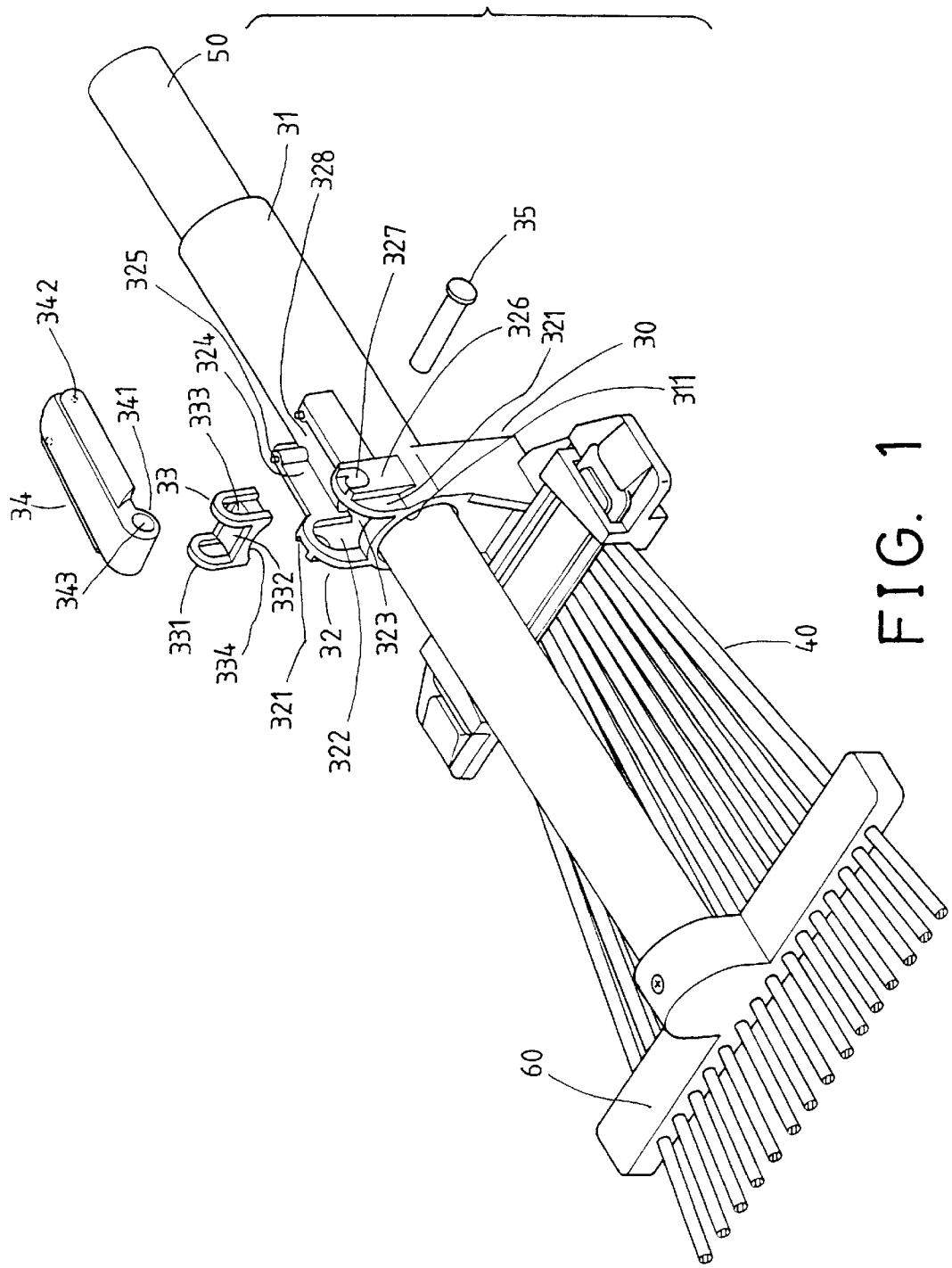
FIG. 1 is a partial exploded view of a quick release clasping device for a rake in accordance with the present invention.

Referring to the drawings, a quick release clasping device in accordance with the present invention may be attached to the rakes or the other tools, and comprises a base 30 including a barrel 31 provided thereon, a number of rake tines 40 having one end pivotally secured to the base 30, a rod or a handle 50 slidably engaged through the bore 311 of the barrel 31 and including a bracket 60 attached thereto for threading with the rake tines 40 and for opening or closing the tines 40 by moving the bracket 60 toward and away from the base 30. The quick release clasping device in accordance with the present invention is provided for clasping the handle 50 to the barrel 31.

The barrel 31 includes a seat 32 provided thereon and having a pair of flaps 321 extended from the barrel 31 and preferably parallel to each other. The flaps 321 each include a channel 322 formed therein, and each include an orifice 327 formed therein and communicating with the channel 322 thereof respectively. The flaps 321 each include a bulge 326 extended outward therefrom for reinforcing the flaps 321 and for allowing the channels 322 to be formed within the flaps 321. The barrel 31 includes an opening 323 formed therein and formed between the flaps 321 and communicating with the channels 322 of the flaps 321 and communicating with the bore 311 of the barrel 31. The flaps 321 each include an extension 324 extended therefrom and each having a projection 325 extended therefrom. A space 328 may be formed and provided between the extensions 324 of the flaps 321.

A press piece 33 is slidably received in the opening 323 of the barrel 31 and includes a pair of ears 331 slidably received in the channels 322 of the flaps 321. The ears 331 each include an oblong hole 333 formed therein for aligning with the orifices 327 of the flaps 321. A shaft 35 is engaged through the orifices 327 of the flaps 321 and through the oblong holes 333 of the ears 331, such that the press piece 33 may be retained to the barrel 31 and will not be disengaged from the barrel 31. The shaft 35 may be slid along the oblong holes 333 of the ears 331 relatively such that the press piece 33 may be slid relative to the barrel 31 for a limited sliding movement. The press piece 33 includes a curved recess 332 formed in the upper portion thereof and formed between the ears 331 and includes a curved depression 334 formed in the bottom thereof for engaging onto the handle 50.

Figure 2:
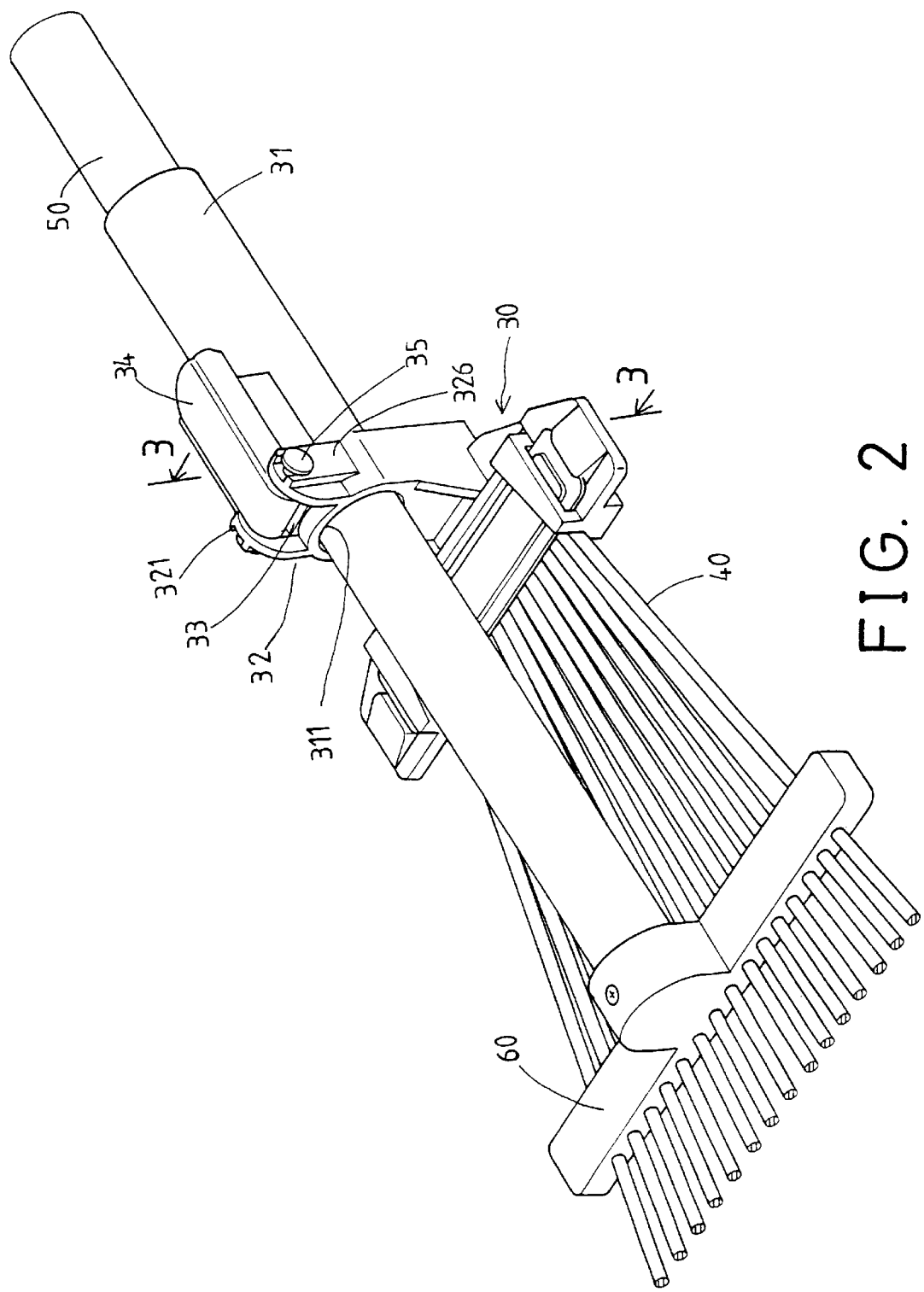
FIG. 2 is a partial perspective view of the quick release clasping device for the rake.
Figure 3:
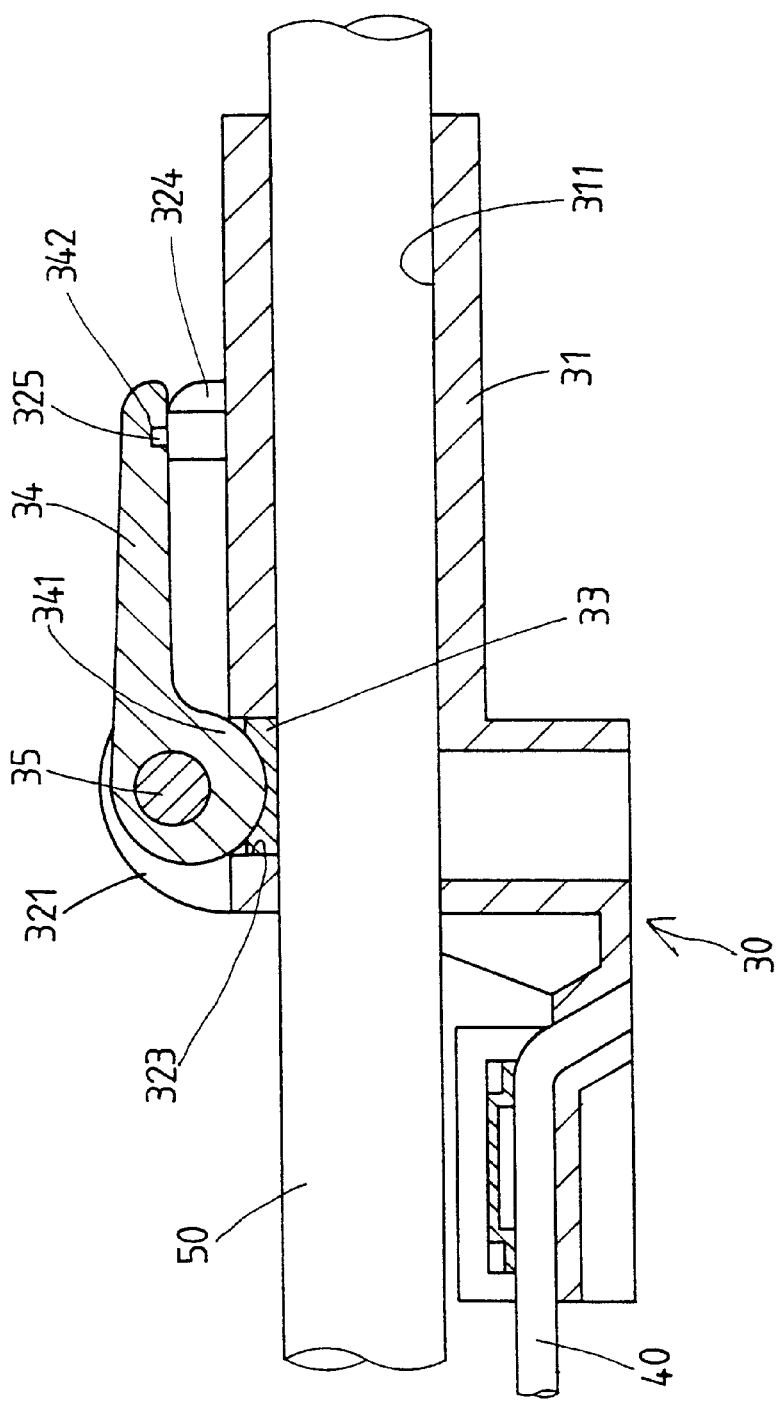
FIG. 3 is a partial cross sectional view taken along lines 3—3 of FIG. 2.

A lever 34 includes a cam 341 formed or provided on one end thereof and engaged between the ears 331 of the press piece 33 and having a hole 343 formed therein for rotatably receiving the shaft 35 and for rotatably securing the lever 34 to the flaps 321 of the seat 32 of the barrel 31. The cam 341 is engaged on the curved recess 332 of the press piece 33 and may be used to force the press piece 33 to engage with and to force against the handle 50 when the cam 341 is rotated relative to the barrel 31. For example, when the lever 34 is pressed toward and to engage with the barrel 31 at the lock position as shown in FIGS. 2 and 3, the cam 341 may force the press piece 33 to engage with the handle 50 and to clamp the handle 50 to the barrel 31. When the lever 34 is rotated away from the barrel 31 about the shaft 35 to a release position, the cam 341 may release the press piece 33 from the handle 50 such that the handle 50 may be slid along the barrel 31 at this time. The lever 34 may include one or more cavities 342 formed therein, particularly formed in the other end distal to the cam 341, for receiving the projections 325 of the extensions 324 of the flaps 321 and for retaining the lever 34 to the barrel 31 at the lock position. The other end of the lever 34 may be moved or rotated away from the barrel 31 by engaging the finger of the user into the space 328 that is formed between the extensions 324 of the flaps 321.

It is to be noted that the press piece 33 may be stably retained in the channels 322 of the flaps 321 and in the opening 323 of the barrel 31 and thus will not be easily disengaged from the flaps 321 of the seat 32. In addition, the press piece 33 may be stably retained to the flaps 321 of the seat 32 and the barrel 31 by the shaft 35, such that the press piece 33 will not be disengaged from the flaps 321 of the seat 32 and the barrel 31 even when the handle 50 is removed or disengaged from the barrel 31 of the base 30.

Accordingly, the quick release clasping device in accordance with the present invention includes a press piece that may be stably retained in the clasping device and will not be disengaged from the clasping device when the handle is removed or disengaged from the clasping device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A quick release clasping device for a tool, said quick release clasping device comprising:
   a barrel including a bore formed therein, and including a pair of flaps extended therefrom, and including an opening formed therein and communicating with said bore of said barrel,
   a handle slidably engaged through said bore of said barrel,
   a press piece slidably received in said opening of said barrel for engaging with said handle, said press piece including a pair of ears extended therefrom, with at least one of said ears engagable with one of said flaps, said ears of said press piece each including an oblong hole formed therein for slidably receiving a shaft therein, and for allowing said press piece to be slid with said barrel relative to said shaft,
   a lever including a first end having a cam provided thereon and engaged between said ears and said flaps and including a second end, and
   said shaft engaged through said flaps and said ears and said cam for rotatably securing said cam to said flaps of said barrel and for retaining said press piece to said flaps.

2. A quick release clasping device for a tool, said quick release clasping device comprising:
   a barrel including a bore formed therein, and including a pair of flaps extended therefrom, and including an opening formed therein and communicating with said bore of said barrel, said flaps of said barrel each including a channel formed therein,
   a handle slidably engaged through said bore of said barrel,
   a press piece slidably received in said opening of said barrel for engaging with said handle, said press piece including a pair of ears extended therefrom and slidably received in said channels of said flaps respectively,
   a lever including a first end having a cam provided thereon and engaged between said ears and said flaps and including a second end, and
   a shaft engaged through said flaps and said ears and said cam for rotatably securing said cam to said flaps and for retaining said press piece to said flaps of said barrel.

3. The quick release clasping device according to claim 2, wherein said flaps of said barrel each include a bulge extended outward therefrom for reinforcing said flaps.

4. The quick release clasping device according to claim 1 further comprising means for retaining said second end of said lever to said barrel.

5. The quick release clasping device according to claim 4, wherein said flaps each include an extension extended therefrom, said retaining means includes at least one projection provided on said extension of said flap, and includes at least one cavity formed in said second end of said lever for receiving said at least one projection.

* * * * *